UNITED STATES PATENT OFFICE.

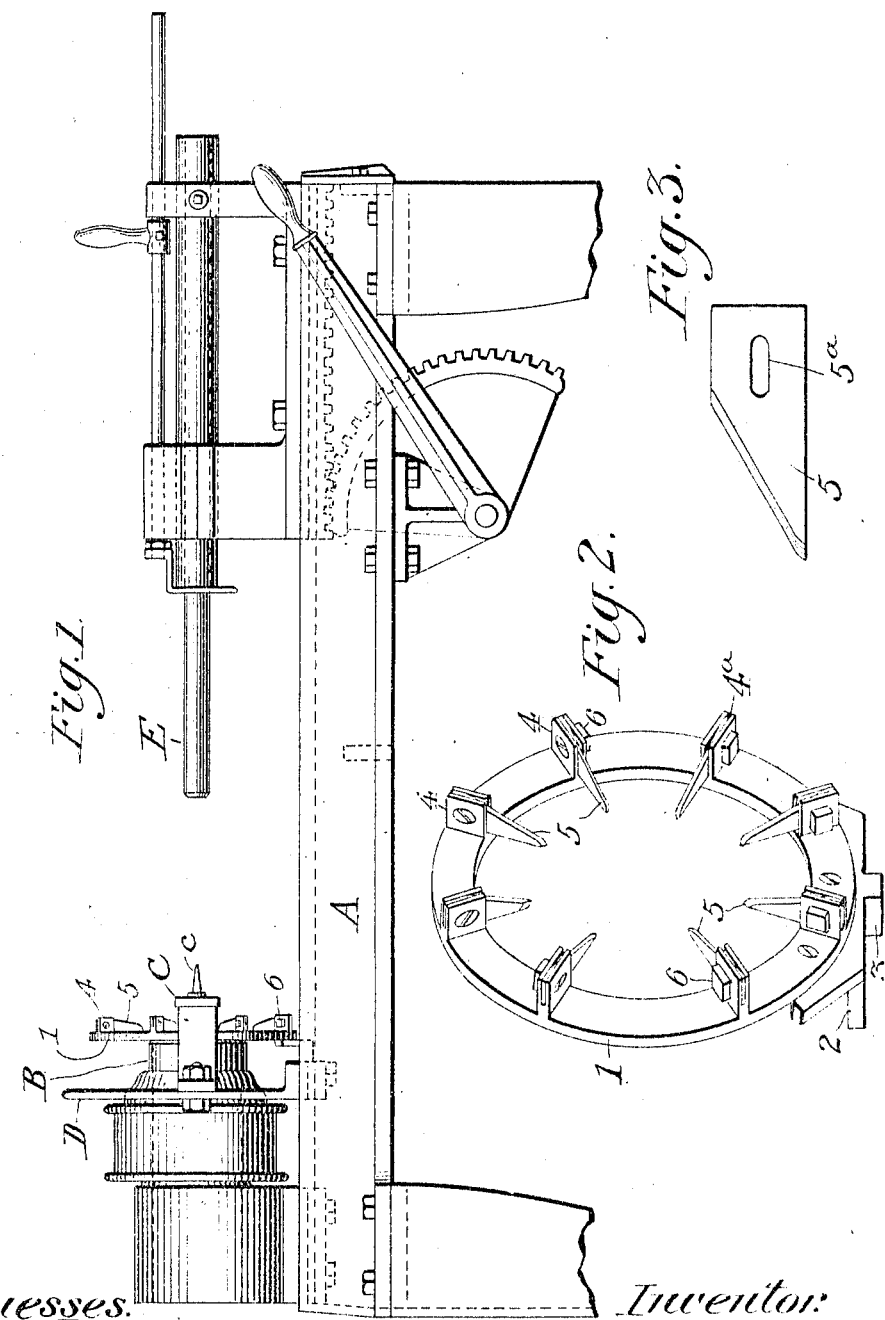

ARCHIE EDWARD LISTER, OF PEARL CITY, TERRITORY OF HAWAII.

PINEAPPLE CORING AND SIZING MACHINE.

978,383. Specification of Letters Patent. Patented Dec. 13, 1910.

Application filed October 16, 1909. Serial No. 522,968.

*To all whom it may concern:*

Be it known that I, ARCHIE EDWARD LISTER, a citizen of the United States, residing at Pearl City, in the county of Honolulu, Territory of Hawaii, have invented certain new and useful Improvements in Pineapple Coring and Sizing Machines; and I do hereby declare the following to be a full, clear, and exact description of the invention, such as will enable others skilled in the art to which it appertains to make and use the same.

This invention relates to machines for treating pineapples or similar fruit to prepare them for canning, and more particularly to pineapple coring and sizing machines of the general type shown in the patent to Zastrow, 805,178, dated November 21, 1905.

The object of the invention is to provide means to slit or incise the rind or outer portion of the fruit at a number of points simultaneously with the sizing operation, which is effected by passing the fruit through the sizing tube embodied in a machine of this kind. In this way, the process of peeling the fruit previous to coring and sizing is eliminated, as will hereafter appear, and there is likewise a saving of fruit. The slitting or incision of the fruit takes place automatically as the latter is forced toward and into the sizing tube, and the slitting and sizing therefore take place at the same operation, without necessitating any trimming down of the fruit prior to such operation.

In carrying out the invention, I preferably use a cutting device in the shape of a ring, and this is preferably bolted upon the machine bed between the sizing tube of the rotary head of the centering abutment. However, so far as the broader aspects of the invention are concerned, the particular form of the cutter and its particular arrangement with respect to the aforesaid parts are immaterial. When a ring-like cutter is used, it is preferably formed of a supporting ring or frame having inwardly projecting knives which can be so adjusted that their points are equidistant from the axis of the sizing tube, with which the cutter, as a whole, is approximately concentric.

In the accompanying drawing:—Figure 1 is a front elevation of a coring and sizing machine embodying the invention, Fig. 2 is a perspective view of a preferred form of cutting attachment, and Fig. 3 is a detailed view of one of the knives.

Referring to the drawing, A is the bed of a machine of the type previously indicated, said bed being provided with the usual longitudinal slot (not shown).

B is the sizing tube of the rotary head and C is the abutment associated with said head and carrying the centering pin c. The abutment C is carried by a suitable bracket D, and the former is capable of swinging in a vertical plane, as is usual in machines of this character. The coring tube E is mounted on the bed in the ordinary way.

According to this invention, a cutting device 1 is interposed between the sizing tube B and the abutment C, said device being adapted to cut the rind of the fruit longitudinally when the fruit is forced through said cutting device toward the sizing tube, as previously explained. Said cutting device is usually formed as a ring, as shown, said ring being provided with an angle piece 2 at the base thereof, and adapted to be bolted on the bed of the machine with a tongue 3 fitting in the slot in the bed. The ring 1 is provided with a plurality of radial lugs, and each of said lugs is formed with two parallel cheeks between which a radial slot $4^a$ is created. A knife blade 5 is removably secured in each slot $4^a$ by a transverse bolt 6 passing through the cheeks of the lugs and through a suitable slot $5^a$ in the knife, as shown, the slotted connection providing for the adjustment of each knife 5 in a radial direction with respect to the ring 1.

By the use of the cutting device described, the peeling of the fruit previous to coring and sizing is made unnecessary. Heretofore it has been necessary to peel the fruit before coring and sizing in order to get rid of the rind and trim the fruit down to approximately its ultimate diameter so that it may be easily pushed through the sizing tube. My cutting device slits or incises the fruit longitudinally at a number of points, the slits extending to what is to be the outer surface of the substantially cylindrical body formed by passing the fruit through the sizing tube; and in this way, the removal of the rind and outer portion in an easy and effective manner, when the fruit is passed through the sizing tube, is made possible.

The slitting and sizing therefore take place at the same operation without its being necessary to pare or peel the fruit beforehand.

It is obvious that I have not attempted to describe all of the numerous modifications of the construction that may be adopted without digressing from my inventive idea.

What I claim is:—

1. In a pineapple coring and sizing machine, the combination with a sizing tube, and an abutment carrying a centering pin, of a cutting attachment interposed between said tube and abutment.

2. In a pineapple coring and sizing machine, the combination with a sizing tube, and a centering abutment associated therewith, of a stationary cutting device interposed between said sizing tube and said abutment and constructed to slit the fruit when the latter is forced toward said tube.

3. In a pineapple coring and sizing machine, the combination with a sizing tube, and a centering abutment associated therewith, of a ring-shaped cutting device concentric with said tube and interposed between the same and said abutment.

4. In a pineapple coring and sizing machine, the combination of means to size the fruit, and means to incise the outer portion only of the fruit substantially simultaneously with the sizing operation.

5. In a pineapple coring and sizing machine, the combination of means to size the fruit, and means to incise longitudinally, during the sizing operation the outer portion only of the fruit.

6. A pineapple coring and sizing machine having a sizing tube, and means in advance of said tube to slit the fruit as it passes into the same.

7. A pineapple coring and sizing machine, comprising a sizing tube, and means in advance of said tube to slit the fruit longitudinally at several points in its circumference as it passes into the sizing tube.

8. In a pineapple coring and sizing machine, the combination with a sizing tube, of a ring-shaped cutting device in advance of the same, operative to slit the fruit as it passes into the sizing tube.

9. In a pineapple coring and sizing machine, the combination with a sizing tube, and a centering abutment, of a cutting device interposed between said tube and said abutment and comprising means to incise the fruit longitudinally at a number of points.

In testimony whereof I affix my signature, in presence of two witnesses.

ARCHIE EDWARD LISTER.

Witnesses:
 ROBT. J. PRATT,
 P. H. BURNETTE.